(12) United States Patent
Tang

(10) Patent No.: US 11,113,460 B2
(45) Date of Patent: Sep. 7, 2021

(54) MULTI-PATH COPYING AND PASTING METHOD AND MOBILE TERMINAL

(71) Applicant: VIVO MOBILE COMMUNICATION CO., LTD., Chang'an Dongguan (CN)

(72) Inventor: Yi Tang, Chang'an Dongguan (CN)

(73) Assignee: VIVO MOBILE COMMUNICATIONS CO., LTD., Guangdong (CN)

(*) Notice: Subject to any disclaimer, the term of this patent is extended or adjusted under 35 U.S.C. 154(b) by 0 days.

(21) Appl. No.: 16/493,215

(22) PCT Filed: Mar. 14, 2018

(86) PCT No.: PCT/CN2018/078964
§ 371 (c)(1),
(2) Date: Sep. 11, 2019

(87) PCT Pub. No.: WO2018/166469
PCT Pub. Date: Sep. 20, 2018

(65) Prior Publication Data
US 2020/0019596 A1 Jan. 16, 2020

(30) Foreign Application Priority Data
Mar. 17, 2017 (CN) .......................... 201710161462.5

(51) Int. Cl.
*G06F 17/24* (2006.01)
*G06F 40/166* (2020.01)
(Continued)

(52) U.S. Cl.
CPC .......... *G06F 40/166* (2020.01); *G06F 3/0482* (2013.01); *G06F 3/04845* (2013.01); *G06F 9/542* (2013.01)

(58) Field of Classification Search
None
See application file for complete search history.

(56) References Cited

U.S. PATENT DOCUMENTS 5,765,156 A * 6/1998 Guzak ...................... G06F 9/543
707/756
5,801,693 A * 9/1998 Bailey ...................... G06T 11/60
715/769

(Continued)

FOREIGN PATENT DOCUMENTS

CN 102262565 A 11/2011
CN 102915296 A 2/2013
(Continued)

OTHER PUBLICATIONS

Extended European Search Report related to Application No. 18768256.2 dated Dec. 10, 2019.
(Continued)

*Primary Examiner* — Maikhanh Nguyen
(74) *Attorney, Agent, or Firm* — von Briessen & Roper, s.c.

(57) ABSTRACT

The multi-path copying and pasting method provided by an embodiment of the present disclosure includes: detecting a selection operation made on a to-be-copied content in a first file; outputting a first prompt box in accordance with the selection operation, a first option indicating the addition of the to-be-copied content into a pasting source list and a second option indicating the addition of the to-be-copied content into a target file in a pasting destination list being included in the first prompt box; receiving a first selection operation made on at least one of the first option and the second option; and in response to the first selection operation, adding the to-be-copied content into the pasting source list as a to-be-pasted content, and/or pasting the to-be-copied content to the selected target file.

9 Claims, 4 Drawing Sheets

(51) Int. Cl.
*G06F 3/0482* (2013.01)
*G06F 3/0484* (2013.01)
*G06F 9/54* (2006.01)

(56) References Cited

U.S. PATENT DOCUMENTS

| | | | | |
|---|---|---|---|---|
| 5,924,099 | A * | 7/1999 | Guzak | G06F 9/543 |
| 6,309,305 | B1 * | 10/2001 | Kraft | G06F 9/543 |
| | | | | 455/566 |
| 7,516,398 | B2 * | 4/2009 | Yang | G06F 40/166 |
| | | | | 715/230 |
| 8,302,021 | B2 * | 10/2012 | Dettinger | G06F 3/0486 |
| | | | | 715/769 |
| 9,552,151 | B2 * | 1/2017 | Ikeda | G06F 40/174 |
| 9,857,970 | B2 * | 1/2018 | Hinckley | G06F 3/04845 |
| 2002/0143985 | A1 * | 10/2002 | Goldstein | G06F 9/543 |
| | | | | 709/238 |
| 2004/0230907 | A1 * | 11/2004 | Yang | G06F 40/166 |
| | | | | 715/255 |
| 2005/0172241 | A1 | 8/2005 | Daniels et al. | |
| 2007/0226713 | A1 | 9/2007 | McGowan et al. | |
| 2012/0304094 | A1 | 11/2012 | Cho | |
| 2015/0012862 | A1 * | 1/2015 | Ikeda | G06F 3/0485 |
| | | | | 715/770 |
| 2016/0378331 | A1 * | 12/2016 | Hinckley | G06F 3/04883 |
| | | | | 715/863 |

FOREIGN PATENT DOCUMENTS

| | | |
|---|---|---|
| CN | 103064584 A | 4/2013 |
| CN | 104299658 A | 1/2015 |
| CN | 104679599 A | 6/2015 |
| CN | 106168905 A | 11/2016 |
| CN | 106959901 A | 7/2017 |
| EP | 0785507 A1 | 7/1997 |

OTHER PUBLICATIONS

Mark Apperley et al., "Breaking the Copy/Paste Cycle: The Stretchable Selection Tool", User Interface Conference, 2000. AUIC 2000. First Australasian Canberra, ACT, Australia 310 Jan.-Feb. 3, 2000, Los Alamitos, CA, USA, IEE Comput. Soc, US, Jan. 31, 2000 (Jan. 31, 2000), pp. 3-10, XP010371179.

International Search Report related to Application No. PCT/CN2018/078964 reported on Jun. 21, 2018.

First CN Office Action related to Application No. 201710161462.5 dated Dec. 7, 2017.

* cited by examiner

MULTI-PATH COPYING AND PASTING METHOD AND MOBILE TERMINAL

CROSS-REFERENCE TO RELATED APPLICATION

The present application is the U.S. national phase of PCT Application No. PCT/CN2018/078964 filed on Mar. 14, 2018, which claims the priority of the Chinese patent application 201710161462.5 filed on Mar. 17, 2017, which are incorporated herein by reference in their entirety.

TECHNICAL FIELD

The present disclosure relates to the field of communication technology, in particular to a multi-path copying and pasting method, and a mobile terminal.

BACKGROUND

Currently, mobile terminals have been widely used in our daily lives, and more and more applications have been installed on the mobile terminal. A copying and pasting function of the mobile terminal, as a commonly-used function, is enabled when a user is confronted with a content in which the user is interested and wants to record.

As a simple and commonly-used copying and pasting method for the mobile terminal, the content is copied once and pasted several times. To be specific, a to-be-pasted content is copied from a file, and then pasted in various applications, so the entire operation is complex, time-consuming and laboursome. Based on the conventional copying and pasting method, when the user wants to paste several to-be-pasted contents from different files to a plurality of applications, it is necessary to repeatedly switch the files, so as to copy and paste the to-be-pasted contents, resulting in that the operation is more complex, more time-consuming and more laboursome.

SUMMARY

An object of the present disclosure is to provide a multi-path copying and pasting method, and a mobile terminal, so as to solve the problem in the related art where the operation is complex, time-consuming and laboursome when the to-be-pasted content is to be pasted in various applications.

In one aspect, the present disclosure provides in some embodiments a multi-path copying and pasting method for a mobile terminal, including: detecting a selection operation made by a user on a to-be-copied content in a first file; outputting a first prompt box in accordance with the selection operation, a first option indicating the addition of the to-be-copied content into a pasting source list and a second option indicating the addition of the to-be-copied content into a target file in a pasting destination list being included in the first prompt box; receiving a first selection operation made by the user on at least one of the first option and the second option; and in response to the first selection operation, adding the to-be-copied content into the pasting source list as a to-be-pasted content, and/or pasting the to-be-copied content to the selected target file.

In another aspect, the present disclosure provides in some embodiments a mobile terminal, including: a first detection module configured to detect a selection operation made by a user on a to-be-copied content in a first file; a first output module configured to output a first prompt box in accordance with the selection operation, a first option indicating the addition of the to-be-copied content into a pasting source list and a second option indicating the addition of the to-be-copied content into a target file in a pasting destination list being included in the first prompt box; a first reception module configured to receive a first selection operation made by the user on at least one of the first option and the second option; and a first response module configured to, in response to the first selection operation, add the to-be-copied content into the pasting source list as a to-be-pasted content, and/or paste the to-be-copied content to the selected target file.

In yet another aspect, the present disclosure provides in some embodiments a mobile terminal, including a processor, a memory, and a computer program stored in the memory and executed by the processor. The processor is configured to execute the computer program so as to implement the above-mentioned multi-path copying and pasting method.

In still yet another aspect, the present disclosure provides in some embodiments a computer-readable storage medium storing therein a computer program. The computer program is executed by a processor so as to implement the above-mentioned multi-path copying and pasting method.

As compared with the related art, the present disclosure will have the following advantages. According to the multi-path copying and pasting method and the mobile terminal in the embodiments of the present disclosure, through providing the pasting source list including a plurality of to-be-pasted contents and the pasting destination list including a plurality of target files, the user may add the to-be-copied contents from different first files into the pasting source list, and add second files where the to-be-pasted contents need to be pasted into the pasting destination list. When the contents in the first files need to be copied and pasted to different second files, the to-be-pasted contents may be selected directly from the pasting source list, and the second files where the to-be-pasted contents need to be pasted may be selected from the pasting destination list, so as to enable the mobile terminal to paste each of the selected to-be-pasted contents to the selected second file. As a result, it is able to perform a multi-path copying and pasting operation in a convenient and time-saving manner without any necessity to repeatedly switch the files, thereby to improve the user experience.

The above description is merely an overview of the schemes in the embodiments of the present disclosure, and the schemes may be implemented in accordance with contents involved in the description so as to enable a person skilled in the art to understand the technical means of the present disclosure in a clearer manner. In order to make the objects, the technical solutions and the advantages of the present disclosure more apparent, the present disclosure will be described hereinafter in a clear and complete manner in conjunction with the drawings and embodiments.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

DETAILED DESCRIPTION

The present disclosure will be described hereinafter in conjunction with the drawings and embodiments. The following embodiments are for illustrative purposes only, but shall not be used to limit the scope of the present disclosure. Actually, the embodiments are provided so as to facilitate the understanding of the scope of the present disclosure.

First Embodiment

Figure 1:
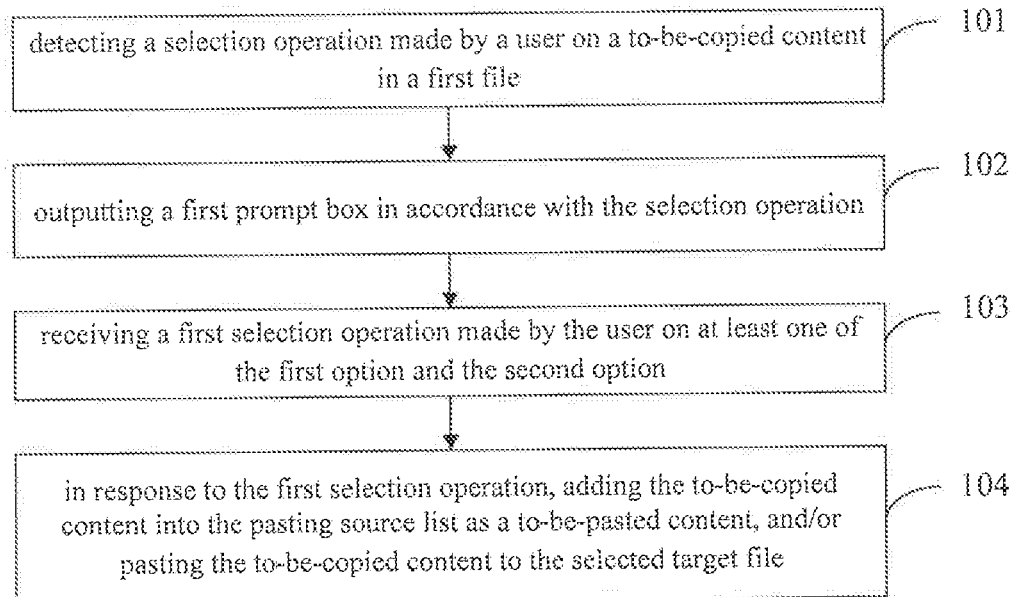
FIG. 1 is a flow chart of a multi-path copying and pasting method according to a first embodiment of the present disclosure.

As shown in FIG. 1, the present disclosure provides in this embodiment a multi-path copying and pasting method which includes the following Steps 101 to 104. Of course, it should be appreciated that, some of Steps 101 to 104 may be replaced with any other appropriate steps or any other appropriate steps may be added according to the practical need, which will not be particularly defined herein.

Step 101: detecting a selection operation made by a user on a to-be-copied content in a first file.

Figure 2:
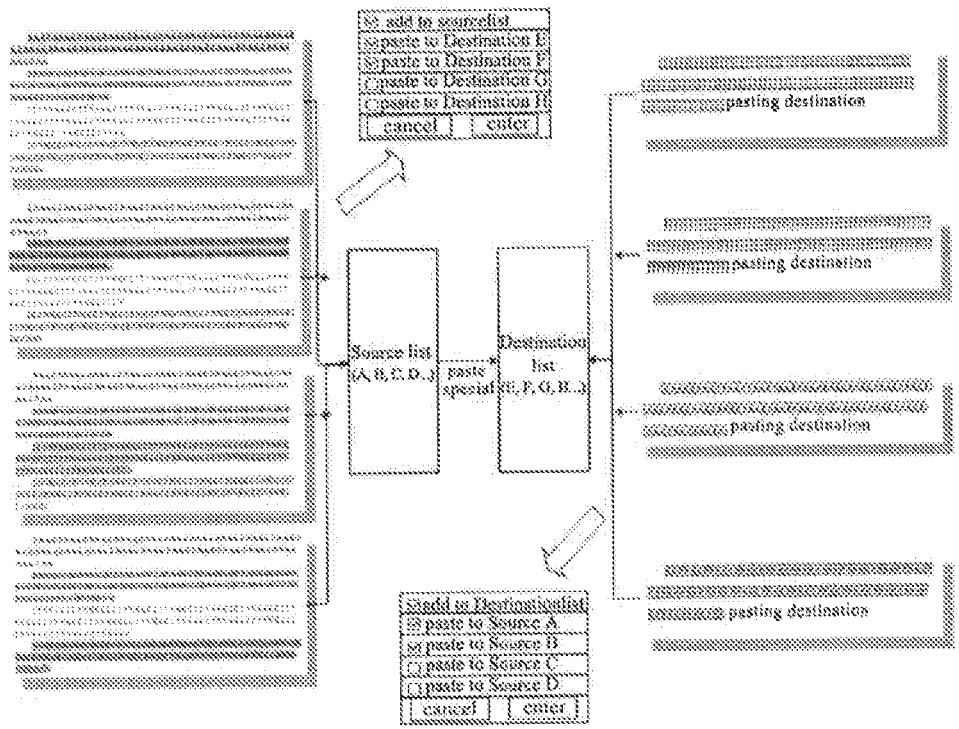
FIG. 2 is a schematic view showing a principle of the multi-path copying and pasting method according to some embodiments of the present disclosure.

In this embodiment, the mobile terminal may be provided with a pasting destination list and a pasting source list. Target files where the content is to be pasted may be added into the pasting destination list, and the to-be-pasted contents copied from different source files may be added into the pasting source list. FIG. 2 shows a principle of copying and pasting the content. To be specific, one or more target files may be selected from the pasting destination list, and one or more to-be-pasted contents may be selected from the pasting source list and pasted to the selected target files respectively. Principles of adding the target files into the pasting destination list and adding the to-be-pasted contents into the pasting source list may refer to those mentioned in the first and second embodiments.

In this embodiment, the multi-path copying and pasting method will be described when the determined to-be-pasted content is added into the pasting source list or the determined to-be-pasted content is directly pasted to the target file. The following description will be given when at least one target file has been added by the user into the pasting destination list in advance.

After a file or an application interface has been opened by the user, the user may perform the selection operation on a to-be-copied content in a current page. For example, the selection operation may include a long-pressing operation, a double-clicking operation or a right-clicking operation on the to-be-copied content after the selection of the to-be-copied content.

Step 102: outputting a first prompt box in accordance with the selection operation.

For example, a first option indicating the addition of the to-be-copied content into a pasting source list and a second option indicating the addition of the to-be-copied content into a target file in a pasting destination list may be included in the first prompt box. The quantity of the second options may be the same as the quantity of the target files included in the pasting destination list. The first prompt box may be an upper prompt box in FIG. 2, for example.

Step 103: receiving a first selection operation made by the user on at least one of the first option and the second option.

The user may merely select the first option, or select one or more second options, or select both the first option and the second option.

Step 104: in response to the first selection operation, adding the to-be-copied content into the pasting source list as a to-be-pasted content, and/or pasting the to-be-copied content to the selected target file.

When merely the first option is selected by the user, the to-be-copied content selected from the first file may be added into the pasting source list. At this time, a to-be-pasted content may be newly added into the pasting source list. When merely the second option is selected by the user, the selected to-be-copied content may be added into the target file corresponding to the selected second option. As shown in FIG. 2, when both the first option and the second option are selected by the user, the selected to-be-copied content may be added into the target file corresponding to the second option, and added into the pasting source list for a subsequent pasting operation.

In a possible embodiment of the present disclosure, when the to-be-copied content has been pasted to the selected target file, context information about a pasted content in the target file may be displayed for the preview of a pasting result.

When the to-be-pasted content has been added into the pasting source list as the to-be-pasted content, the to-be-pasted content may be displayed in the pasting source list, and the pasting source list may be set to be in an editable state. Because the pasting source list is in the editable state, the user may delete or edit a certain piece of to-be-pasted content in the pasting source list.

According to the multi-path copying and pasting method in the first embodiment of the present disclosure, through providing the pasting source list including a plurality of to-be-pasted contents and the pasting destination list including a plurality of target files, the user may add the to-be-copied contents from different first files into the pasting source list, and add second files where the to-be-pasted contents need to be pasted into the pasting destination list. When the contents in the first files need to be copied and pasted to different second files, the to-be-pasted contents may be selected directly from the pasting source list, and the second files where the to-be-pasted contents need to be pasted may be selected from the pasting destination list, so as to enable the mobile terminal to paste each of the selected to-be-pasted contents to the selected second file. As a result, it is able to perform a multi-path copying and pasting operation in a convenient and time-saving manner without any necessity to repeatedly switch the files, thereby to improve the user experience.

Second Embodiment

Figure 3:
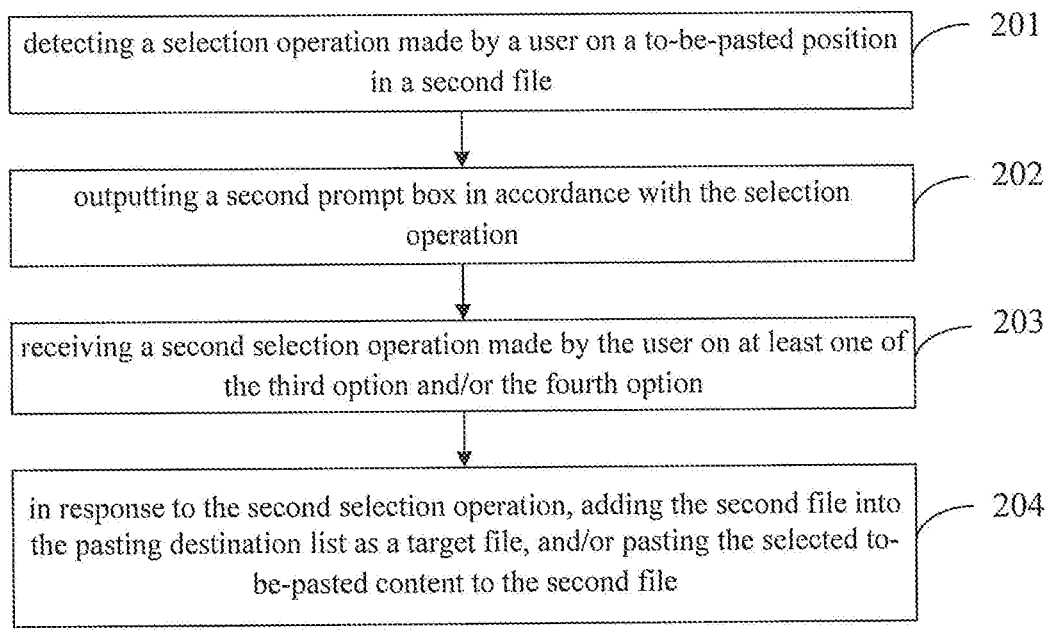
FIG. 3 is another flow chart of the multi-path copying and pasting method according to a second embodiment of the present disclosure.

As shown in FIG. 3, the present disclosure further provides in this embodiment a multi-path copying and pasting method.

In this embodiment, the multi-path copying and pasting method will be described when a determined file where a content is to be pasted is added into a pasting destination list or a to-be-pasted content is selected from a pasting source list and pasted to the file. The multi-path copying and pasting method may include the following Steps 201 to 204. Of course, it should be appreciated that, some of Steps 201 to 204 may be replaced with any other appropriate steps or any other appropriate steps may be added according to the practical need, which will not be particularly defined herein.

Step 201: detecting a selection operation made by a user on a to-be-pasted position in a second file.

In this embodiment, the mobile terminal may be provided with the pasting destination list and the pasting source list "Source List". Target files where the content is to be pasted may be added into the pasting destination list, and the to-be-pasted contents copied from different source files may be added into the pasting source list. FIG. 2 shows a principle of copying and pasting the content. To be specific, one or more target files may be selected from the pasting destination list, and one or more to-be-pasted contents may be selected from the pasting source list and pasted to the selected target files respectively. A mode for pasting the to-be-pasted content from the pasting source list may refer to that mentioned in the first embodiment. A mode for adding the target file in the pasting destination list will be mainly described in this embodiment.

In this embodiment, the description will be given in the following when at least one to-be-pasted content has been added by the user into the pasting source list in advance.

After a file or an application interface has been opened by the user, the user may perform the selection operation at a position where the content is to be pasted. For example, the selection operation may include a long-pressing operation, a double-clicking operation or a right-clicking operation, so as to trigger the mobile terminal to output a second prompt box.

In a possible embodiment of the present disclosure, after the detection of the selection operation made by the user on the to-be-pasted position in the second file, the second prompt box may not be directly outputted, and instead a shortcut pasting prompt option may be outputted in accordance with the selection operation. Upon the receipt of the selection operation made by the user on the prompt option, a newly-added to-be-pasted content in the pasting source list may be added to the to-be-pasted position in the second file. When the user fails to select the prompt option but turns off the option, Step 202 may be performed. This mode is more smart and convenient, so it is able to further improve the user experience.

Step 202: outputting the second prompt box in accordance with the selection operation.

For example, a third option indicating the addition of the second file into the pasting destination list and a fourth option indicating the to-be-pasted content in the pasting source list into the second file may be included in the second prompt box. The second prompt box may be a lower prompt box in FIG. 2, for example.

Step 203: receiving a second selection operation made by the user on at least one of the third option and the fourth option.

For example, the user may merely select the third option, or select one or more fourth options, or select both the third option and the fourth option.

Step 204: in response to the second selection operation, adding the second file into the pasting destination list as a target file, and/or pasting the selected to-be-pasted content to the second file.

When merely the third option is selected by the user, the second file may be added into the pasting destination list. At this time, a new target file may be added into the pasting destination list. When merely the fourth option is selected by the user, the to-be-pasted content corresponding to the selected fourth option may be pasted to the to-be-pasted position in the second file. As shown in FIG. 2, when both the third option and the fourth option are selected by the user, the second file may be added into the pasting destination list and the to-be-pasted content corresponding to the selected fourth option may be pasted to the second file simultaneously.

In a possible embodiment of the present disclosure, when the second file has been added into the pasting destination list as the target file, information about the target file may be displayed in the pasting destination list, and the pasting destination list may be set to be in an edible state. Because the pasting destination list is in the editable state, the user may delete or edit a certain target file in the pasting destination list.

When the selected to-be-pasted content has been pasted to the to-be-pasted position in the second file, context information about a pasted content in the second file may be displayed for the preview of a pasting result.

According to the multi-path copying and pasting method in the second embodiment of the present disclosure, through providing the pasting source list including a plurality of to-be-pasted contents and the pasting destination list including a plurality of target files, the user may add the to-be-copied contents from different first files into the pasting source list, and add second files where the to-be-pasted contents need to be pasted into the pasting destination list. When the contents in the first files need to be copied and pasted to different second files, the to-be-pasted contents may be selected directly from the pasting source list, and the second files where the to-be-pasted contents need to be pasted may be selected from the pasting destination list, so as to enable the mobile terminal to paste each of the selected to-be-pasted contents to the selected second file. As a result, it is able to perform a multi-path copying and pasting operation in a convenient and time-saving manner without any necessity to repeatedly switch the files, thereby to improve the user experience.

Third Embodiment

Figure 4:
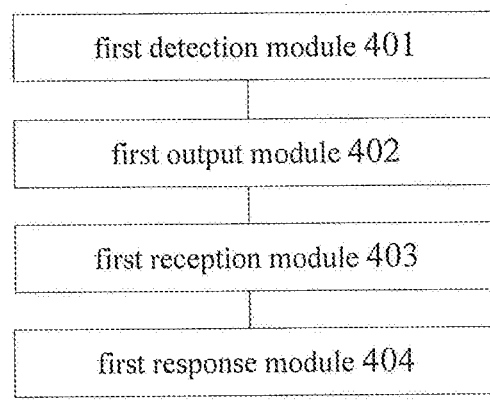
FIG. 4 is a schematic view showing a mobile terminal according to a third embodiment of the present disclosure.

As shown in FIG. 4, the present disclosure provides in this embodiment a mobile terminal, which includes: a first detection module 401 configured to detect a selection operation made by a user on a to-be-copied content in a first file; a first output module 402 configured to output a first prompt box in accordance with the selection operation, a first option indicating the addition of the to-be-copied content into a pasting source list and a second option indicating the addition of the to-be-copied content into a target file in a pasting destination list being included in the first prompt box; a first reception module 403 configured to receive a first selection operation made by the user on at least one of the first option and the second option; and a first response module 404 configured to, in response to the first selection operation, add the to-be-copied content into the pasting source list as a to-be-pasted content, and/or paste the to-be-copied content to the selected target file.

According to the mobile terminal in the third embodiment of the present disclosure, through providing the pasting source list including a plurality of to-be-pasted contents and the pasting destination list including a plurality of target files, the user may add the to-be-copied contents from different first files into the pasting source list, and add second files where the to-be-pasted contents need to be pasted into the pasting destination list. When the contents in the first files need to be copied and pasted to different second files, the to-be-pasted contents may be selected directly from the pasting source list, and the second files where the to-be-pasted contents need to be pasted may be selected from the pasting destination list, so as to enable the mobile terminal to paste each of the selected to-be-pasted contents to the selected second file. As a result, it is able to perform a multi-path copying and pasting operation in a convenient and time-saving manner without any necessity to repeatedly switch the files, thereby to improve the user experience.

Fourth Embodiment

Figure 5:
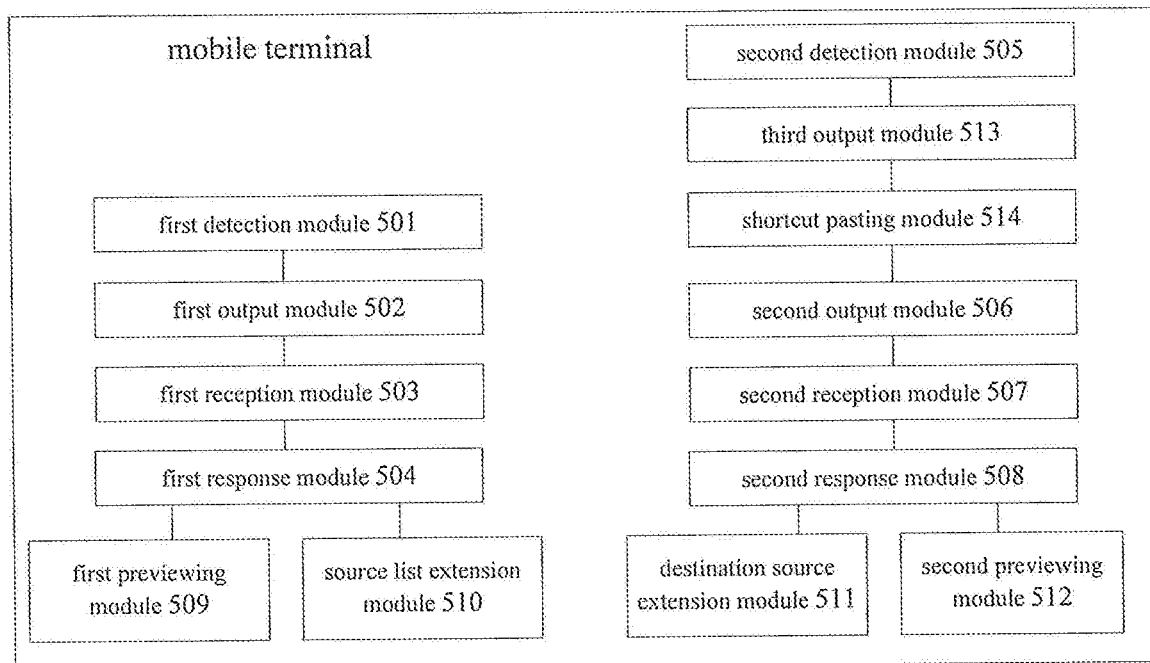
FIG. 5 is another schematic view showing the mobile terminal according to a fourth embodiment of the present disclosure.

As shown in FIG. 5, the present disclosure further provides in this embodiment a mobile terminal. As further optimization of the mobile terminal in the third embodiment, the mobile terminal in this embodiment includes: a first detection module 501 configured to detect a selection operation made by a user on a to-be-copied content in a first file; a first output module 502 configured to output a first prompt box in accordance with the selection operation, a first option indicating the addition of the to-be-copied content into a pasting source list and a second option indicating the addition of the to-be-copied content into a target file in a pasting destination list being included in the first prompt box; a first reception module 503 configured to receive a first selection operation made by the user on at least one of the first option and the second option; and a first response module 504 configured to, in response to the first selection operation, add the to-be-copied content into the pasting source list as a to-be-pasted content, and/or paste the to-be-copied content to the selected target file.

In a possible embodiment of the present disclosure, as shown in FIG. 5, the mobile terminal may further include: a second detection module 505 configured to detect a selection operation made by the user on a to-be-pasted position in a second file; a second output module 506 configured to output a second prompt box in accordance with the selection operation, a third option indicating the addition of the second file into the pasting destination list and a fourth option indicating the to-be-pasted content in the pasting source list into the second file being included in the second prompt box; a second reception module 507 configured to receive a second selection operation made by the user on at least one of the third option and/or the fourth option; and a second response module 508 configured to, in response to the second selection operation, add the second file into the pasting destination list as a target file, and/or paste the selected to-be-pasted content to the second file.

In a possible embodiment of the present disclosure, as shown in FIG. 5, the mobile terminal may further include: a first previewing module 509 configured to, after the to-be-copied content has been pasted by the first response module 504 to the selected target file, display context information about the pasted content in the second file for the preview of a pasting result; and a source list extension module 510 configured to, after the to-be-copied content has been added by the first response module 504 into the pasting source list as the to-be-pasted content, display the to-be-pasted content in the pasting source list, and set the pasting source list to be in an editable state.

In a possible embodiment of the present disclosure, as shown in FIG. 5, the mobile terminal may further include: a destination list extension module 511 configured to, after the second file has been added by the second response module 508 into the pasting destination list as the target file, display information about the target file in the pasting destination list and set the pasting destination list to be in an editable state; and a second previewing module 512 configured to, after the selected to-be-pasted content has been pasted by the second response module 508 to the to-be-pasted position in the second file, display context information about a pasted content in the second file for the subsequent preview of a pasting result.

In a possible embodiment of the present disclosure, as shown in FIG. 5, the mobile terminal may further include: a third output module 513 configured to, after the second detection module 505 has detected the selection operation made by the user on the to-be-pasted position in the second file, output a shortcut pasting prompt option in accordance with the selection operation; and a shortcut pasting module 514 configured to, upon the receipt of a selection operation made by the user on the prompt option, add a newly-added to-be-pasted content in the pasting source list to the to-be-pasted position in the second file.

The mobile terminal in this embodiment may be adopted to implement the above-mentioned multi-path copying and pasting method in the first and second embodiments with a same or similar beneficial effect, and thus will not be particularly defined herein.

Fifth Embodiment

Figure 6:
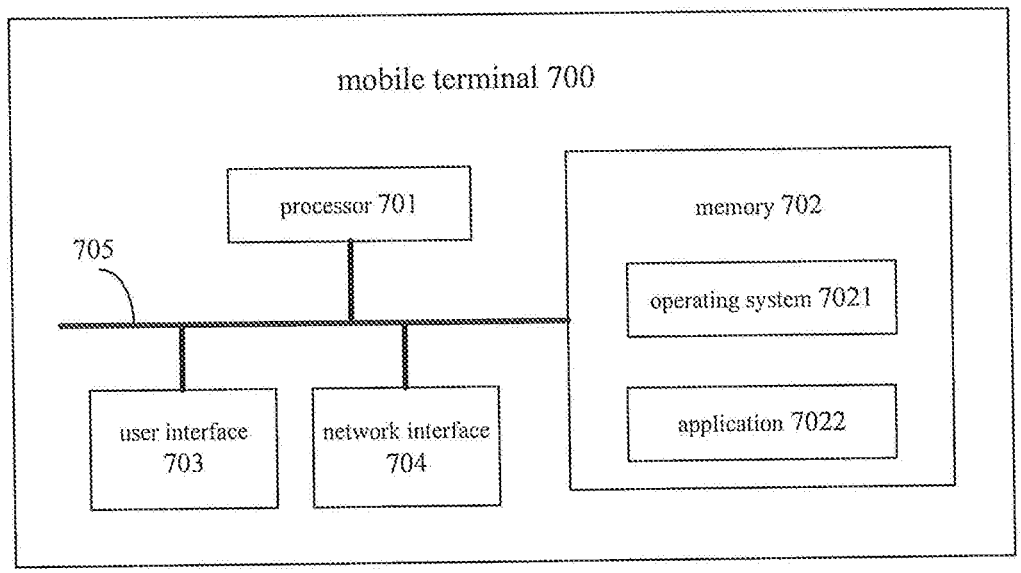
FIG. 6 is yet another schematic view showing the mobile terminal according to a fifth embodiment of the present disclosure.

As shown in FIG. 6, the present disclosure further provides in this embodiment a mobile terminal 700 which includes at least one processor 701, a memory 702, at least one network interface 704 and a user interface 703. The components of the mobile terminal 700 may be coupled together through a bus system 705. It should be appreciated that, the bus system 705 is configured to achieve connection and communication among the components. Apart from a data bus, the bus system 705 may further include a power source bus, a control bus and a state signal bus. For clarification, all these buses in FIG. 6 may be collectedly called as bus system 705.

The user interface 703 may include a display, a keyboard or a pointing device (e.g., mouse, track ball, touch plate or touch panel).

It should be appreciated that, the memory 702 may be a volatile memory, a nonvolatile memory or both. The nonvolatile memory may be a Read-Only Memory (ROM), a Programmable ROM (PROM), an Erasable PROM (EPROM), an electrically EPROM (EEPROM) or a flash memory. The volatile memory may be a Random Access Memory (RAM) which serves as an external high-speed cache. Illustratively but nonrestrictively, the RAM may include Static RAM (SRAM), Dynamic RAM (DRAM), Synchronous DRAM (SDRAM), Double Data Rate SDRAM (DDRSDRAM), Enhanced SDRAM (ESDRAM), Synchronous Link DRAM (SLDRAM) or Direct Rambus RAM (DRRAM). The memory 702 intends to include, but not limited to, the above-mentioned and any other appropriate memories.

In a possible embodiment of the present disclosure, the following elements may be stored in the memory 702: an executable module or data structure, a subset or an extended set thereof, an operating system 7021 and an application 7022.

The operating system 7021 may include various system programs, e.g., a framework layer, a core layer and a driving layer, so as to implement various basic services and process hardware-based tasks. The application 7022 may include various applications, e.g., Media Player and Browser, so as to implement various application services. The programs for implementing the above-mentioned method may be included in the application 7022.

In this embodiment, through calling a program or instruction stored in the memory 702, e.g., a program or instruction stored in the application 7022, the processor 701 is configured to: detect a selection operation made by a user on a to-be-copied content in a first file; output a first prompt box in accordance with the selection operation, a first option indicating the addition of the to-be-copied content into a pasting source list and a second option indicating the addition of the to-be-copied content into a target file in a pasting destination list being included in the first prompt box; receive a first selection operation made by the user on at least one of the first option and the second option; and in response to the first selection operation, add the to-be-copied content into the pasting source list as a to-be-pasted content, and/or paste the to-be-copied content to the selected target file.

The above-mentioned method may be applied to, or implemented by, the processor 701. The processor 701 may be an integrated circuit (IC) having a signal processing capability. During the implementation, the steps of the above-mentioned method may be completed through an integrated logic circuit of hardware in the processor 701 or instructions in the form of software. The processor 701 may be a general-purpose processor, a digital signal processor, an application-specific integrated circuit (ASIC), a field programmable gate array (FPGA) or any other programmable logic element, a discrete gate or transistor logic element, or a discrete hardware assembly, which may be used to implement or execute the methods, steps or logic diagrams in the embodiments of the present disclosure. The general purpose processor may be a microprocessor or any other conventional processor. The steps of the method in the embodiments of the present disclosure may be directly implemented by the processor in the form of hardware, or a combination of hardware and software modules in the processor. The software module may be located in a known storage medium such as an RAM, a flash memory, an ROM, a PROM, an EEPROM, or a register. The storage medium may be located in the memory 702, and the processor 701 may read information stored in the memory 702 so as to implement the steps of the method in conjunction with the hardware.

It should be appreciated that, the embodiments of the present disclosure may be implemented by hardware, software, firmware, middleware, microcode or a combination thereof. For the hardware implementation, the processor may include one or more of an ASIC, a DSP, a DSP device (DSPD), a Programmable Logic Device (PLD), an FPGA, a general-purpose processor, a controller, a microcontroller, a microprocessor, any other electronic unit capable of achieving the functions in the present disclosure, or a combination thereof.

For the software implementation, the scheme in the embodiments of the present disclosure may be implemented through modules capable of achieving the functions in the present disclosure (e.g., processes or functions). Software codes may be stored in the memory and executed by the processor. The memory may be implemented inside or outside the processor.

In a possible embodiment of the present disclosure, when adding the target file in the pasting target list, the processor 701 is further configured to: detect a selection operation made by the user on a to-be-pasted position in a second file; output a second prompt box in accordance with the selection operation, a third option indicating the addition of the second file into the pasting destination list and a fourth option indicating the to-be-pasted content in the pasting source list into the second file being included in the second prompt box; receive a second selection operation made by the user on at least one of the third option and/or the fourth option; and in response to the second selection operation, add the second file into the pasting destination list as a target file, and/or paste the selected to-be-pasted content to the second file.

In a possible embodiment of the present disclosure, after the to-be-copied content has been added to the pasting source list as the to-be-pasted content and/or the to-be-copied content has been pasted to the selected target file, the processor 701 is further configured to: when the to-be-copied content has been pasted to the selected target file, display context information about the pasted content in the second file for the preview of a pasting result; and after the to-be-copied content has been added into the pasting source list as the to-be-pasted content, display the to-be-pasted content in the pasting source list, and set the pasting source list to be in an editable state.

In a possible embodiment of the present disclosure, after the second file has been added into the pasting destination list as the target file and/or the selected to-be-pasted content has been pasted to the to-be-pasted position in the second file, the processor 701 is further configured to: when the second file has been added into the pasting destination list as the target file, display information about the target file in the pasting destination list and set the pasting destination list to be in an editable state; and when the selected to-be-pasted content has been pasted to the to-be-pasted position in the second file, display context information about a pasted content in the second file for the subsequent preview of a pasting result.

In a possible embodiment of the present disclosure, after the detection of the selection operation made by the user on the to-be-pasted position in the second file, the processor 701 is further configured to: output a shortcut pasting prompt option in accordance with the selection operation; and upon the receipt of a selection operation made by the user on the prompt option, add a newly-added to-be-pasted content in the pasting source list to the to-be-pasted position in the second file.

The mobile terminal 700 may be adopted to implement the above-mentioned multi-path copying and pasting method, which will not be particularly defined herein.

According to the mobile terminal in the fifth embodiment of the present disclosure, through providing the pasting source list including a plurality of to-be-pasted contents and the pasting destination list including a plurality of target files, the user may add the to-be-copied contents from different first files into the pasting source list, and add second files where the to-be-pasted contents need to be pasted into the pasting destination list. When the contents in the first files need to be copied and pasted to different second files, the to-be-pasted contents may be selected directly from the pasting source list, and the second files where the to-be-pasted contents need to be pasted may be selected from the pasting destination list, so as to enable the mobile terminal to paste each of the selected to-be-pasted contents to the selected second file. As a result, it is able to perform a multi-path copying and pasting operation in a convenient and time-saving manner without any necessity to repeatedly switch the files, thereby to improve the user experience.

Sixth Embodiment

Figure 7:
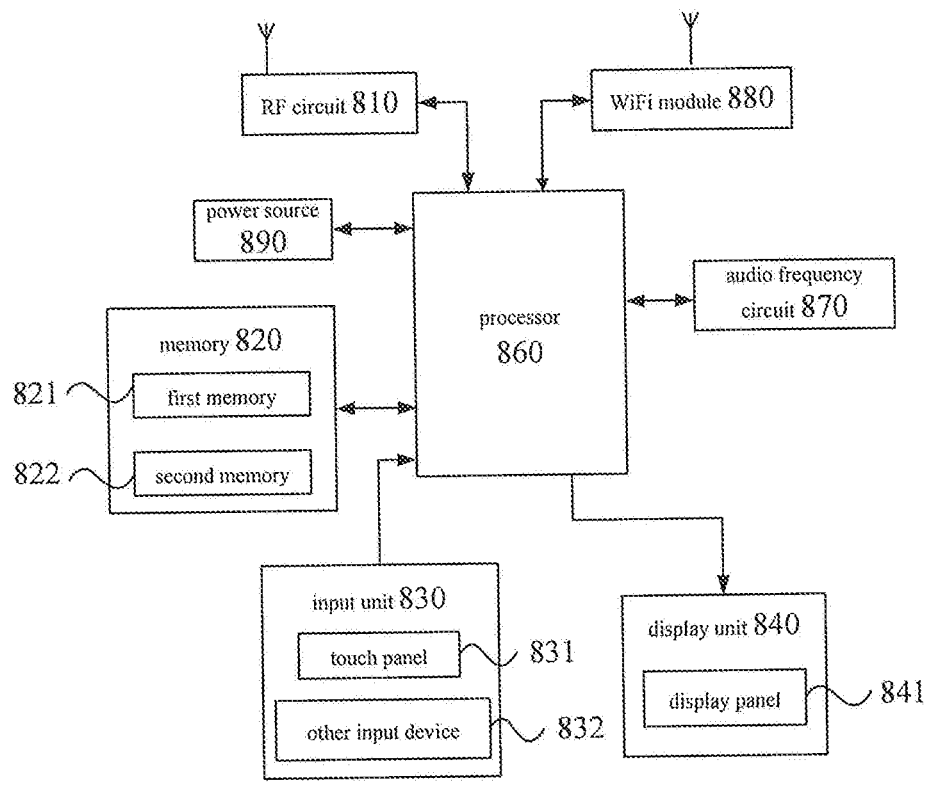
FIG. 7 is still yet another schematic view showing the mobile terminal according to a sixth embodiment of the present disclosure.

As shown in FIG. 7, the present disclosure further provides in this embodiment a mobile terminal. The mobile terminal may be a mobile phone, a flat-panel computer, a Person Digital Assistant (PDA) or a vehicle-mounted computer.

As shown in FIG. 7, the mobile terminal may include a Radio Frequency (RF) circuit 810, a memory 820, an input unit 830, a display unit 840, a processor 860, an audio frequency circuit 870, a Wireless Fidelity (WiFi) module 880 and a power source 890.

The input unit 830 is configured to receive digital or character information inputted by a user, and generate a signal input related to user settings and function control of the mobile terminal 800. To be specific, the input unit 830 may include a touch panel 831. The touch panel 831, also called as touch screen, is configured to collect a touch operation made by the user on or in proximity to the touch panel (e.g., an operation made by the user through any appropriate object or attachment (e.g., finger or stylus) on or in the proximity to the touch panel 831). The touch panel 831 may include a touch detection unit and a touch controller. The touch detection unit is configured to detect a touch position and a signal generated due to the touch operation, and transmit the signal to the touch controller. The touch controller is configured to receive touch information from the touch detection unit, convert it into coordinates of a touch point, transmit the coordinates to the processor 860, and receive and execute a command from the processor 860. In addition, the touch panel 831 may be of a resistive type, a capacitive type, an infrared type or a surface acoustic wave (SAW) type. Apart from the touch panel 831, the input unit 830 may further include an input device 832 which may include, but not limited to, a physical keyboard, a functional button (e.g., a volume control button or an on/off button), a trackball, a mouse, and a joystick, which will not be particularly defined herein.

The display unit 840 is configured to display information inputted by the user or information to be presented to the user, and various interfaces for the mobile terminal 800, and it may include a display panel 841. In a possible embodiment of the present disclosure, the display panel 841 may be a Liquid Crystal Display (LCD) panel or an Organic Light-Emitting Diode (OLED) panel.

It should be appreciated that, the touch panel 831 may cover the display panel 841, so as to form a touch display panel. When the touch operation made on or in proximity to the touch display panel has been detected, the touch information may be transmitted to the processor 860 so as to determine a type of a touch event. Then, the processor 860 may provide corresponding visual output on the touch display panel in accordance with the type of the touch event.

The touch display panel may include an application interface display region and a commonly-used controls display region. An arrangement mode of the two display regions will not be particularly defined herein, e.g., one of the two display regions may be arranged above or under the other, or arranged to the left or the right of the other. The application interface display region may be adopted to display interfaces for applications, and each interface may include an icon for at least one application and/or an interface element such as Widget desktop control. The application interface display region may also be a blank interface where no content is contained. The commonly-used controls display region may be adopted to display controls which are used frequently, e.g., setting button, interface number, scroll bar, or such application icons as telephone book icon.

The processor 860 may be a control center of the mobile terminal 800, and connected to each member of the entire mobile terminal via various interfaces and lines. The processor 860 is configured to run or execute software programs and/or modules stored in a first memory 821, and call data stored in a second memory 822, so as to achieve various functions of the mobile terminal 800 and process the data, thereby to monitor the mobile terminal 800. In a possible embodiment of the present disclosure, the processor 860 may include one or more processing units.

In the embodiments of the present disclosure, through calling a program or instruction stored in the first memory 821 and/or the data stored in the second memory 822, the processor 860 is configured to: detect a selection operation made by a user on a to-be-copied content in a first file; output a first prompt box in accordance with the selection operation, a first option indicating the addition of the to-be-copied content into a pasting source list and a second option indicating the addition of the to-be-copied content into a target file in a pasting destination list being included in the first prompt box; receive a first selection operation made by the user on at least one of the first option and the second option; and in response to the first selection operation, add the to-be-copied content into the pasting source list as a to-be-pasted content, and/or paste the to-be-copied content to the selected target file.

In a possible embodiment of the present disclosure, when adding the target file in the pasting target list, the processor 860 is further configured to: detect a selection operation made by the user on a to-be-pasted position in a second file; output a second prompt box in accordance with the selection operation, a third option indicating the addition of the second file into the pasting destination list and a fourth option indicating the to-be-pasted content in the pasting source list into the second file being included in the second prompt box; receive a second selection operation made by the user on at least one of the third option and/or the fourth option; and in response to the second selection operation, add the second file into the pasting destination list as a target file, and/or paste the selected to-be-pasted content to the second file.

In a possible embodiment of the present disclosure, after the to-be-copied content has been added to the pasting source list as the to-be-pasted content and/or the to-be-copied content has been pasted to the selected target file, the processor 860 is further configured to: when the to-be-copied content has been pasted to the selected target file, display context information about the pasted content in the second file for the preview of a pasting result; and after the to-be-copied content has been added into the pasting source list as the to-be-pasted content, display the to-be-pasted content in the pasting source list, and set the pasting source list to be in an editable state.

In a possible embodiment of the present disclosure, after the second file has been added into the pasting destination list as the target file and/or the selected to-be-pasted content has been pasted to the to-be-pasted position in the second file, the processor 860 is further configured to: when the second file has been added into the pasting destination list as the target file, display information about the target file in the pasting destination list and set the pasting destination list to be in an editable state; and when the selected to-be-pasted content has been pasted to the to-be-pasted position in the second file, display context information about a pasted content in the second file for the subsequent preview of a pasting result.

In a possible embodiment of the present disclosure, after the detection of the selection operation made by the user on the to-be-pasted position in the second file, the processor 860 is further configured to: output a shortcut pasting prompt option in accordance with the selection operation; and upon the receipt of a selection operation made by the user on the prompt option, add a newly-added to-be-pasted content in the pasting source list to the to-be-pasted position in the second file.

According to the mobile terminal in the fifth embodiment of the present disclosure, through providing the pasting source list including a plurality of to-be-pasted contents and the pasting destination list including a plurality of target files, the user may add the to-be-copied contents from different first files into the pasting source list, and add second files where the to-be-pasted contents need to be pasted into the pasting destination list. When the contents in the first files need to be copied and pasted to different second files, the to-be-pasted contents may be selected directly from the pasting source list, and the second files where the to-be-pasted contents need to be pasted may be selected from the pasting destination list, so as to enable the mobile terminal to paste each of the selected to-be-pasted contents to the selected second file. As a result, it is able to perform a multi-path copying and pasting operation in a convenient and time-saving manner without any necessity to repeatedly switch the files, thereby to improve the user experience.

The device embodiments are substantially similar to the method embodiments, so the terminal device has been described in a relatively brief manner, i.e., the relevant description may refer to that mentioned in the method embodiments.

The scheme in the embodiments of the present may not be inherently related to any specific computer, virtual system or any other device. Various general-purpose systems may be used together in accordance with the mentioned teachings. Based on the above description, it is obvious to form the required structure for the system in the embodiments of the present disclosure. In addition, the scheme in the embodiments of the present disclosure may not be provided with respect to any specific programming language. It should be appreciated that, various programming languages may be adopted to implement the scheme in the embodiments of the present disclosure. In addition, the above description relates to the preferred embodiments of the present disclosure.

Although with a large amount of details mentioned hereinabove, the present disclosure will be practiced without these details. In some embodiments of the present disclosure, structures and techniques known in the art will not be described, so as not to confuse the understanding of the present disclosure.

Similarly, it should be appreciated that, in order to facilitate the understanding of the present disclosure, the features may be grouped in a single component, drawing or the relevant description. However, the disclosed device shall not be interpreted as to include more features that those defined in each of the appended claims. More definitely, as those defined in the appended claims, each aspect of the present disclosure may include the features less than the features in a single one of the above-mentioned embodiments. Hence, the claims for a specific embodiment may be definitely incorporated into the embodiment, and each claim itself may serve as a separate embodiment of the present disclosure.

It should be appreciated that, the members of the device in a specific embodiment may be changed adaptively and arranged in one or more devices different from that mentioned in the embodiment. In addition, the members may be combined into a single member, or divided into more members. Apart from the features that are mutually exclusive, the other features described in the specification (including the appended claims, the abstract and the drawings) may be combined in any form. Unless otherwise defined, each feature in the specification (including the appended claims, the abstract and the drawings) may be replaced with another feature for an identical, equivalent or similar purpose.

It should be further appreciated that, although some embodiments of the present disclosure include some, but not the other, features in the other embodiments, the combination of the features in different embodiments shall also fall within the scope of the present disclosure. For example, any of the embodiments corresponding to the appended claims may be combined in any form.

The members in the embodiments of the present disclosure may be implemented as hardware, or software modules run on one or more processors, or a combination thereof. It should be appreciated that, some or all functions of some or all members in the scheme may be achieved via a microprocessor or a Digital Signal Processor (DSP) in practice. In addition, the scheme in the embodiments of the present disclosure may also be implemented as a device or apparatus program (e.g., a computer program and a computer program product) capable of executing parts or all of the steps of the mentioned method. The program may be stored in a computer-readable medium, or may be provided in the form of one or more signals. The signals may be downloaded from Internet, or acquired from a carrier, or provided in any other form.

It should be further appreciated that, the above embodiments are for illustrative, but not restrictive, purposes, and substitutions may be made without departing from the scope as set forth in the appended claims. In the appended claims, any reference numeral in parenthesis shall not be construed as limiting the claims. The word "include" shall not be construed as excluding any other member or component not defined in the claims. The expression "one" or "one of" ahead of a member or component shall not be construed as excluding more than one member or component. The scheme in the present disclosure may be implemented through a device including different members. In the appended claims where several members have been defined, some of these members may be implemented as a same member. The words "first", "second" and "third" shall not be used to represent any order, and these words may be interpreted as nomenclatures.

What is claimed is:

1. A multi-path copying and pasting method for a mobile terminal, comprising:
    detecting a selection operation made on a to-be-copied content in a first file;
    outputting a first prompt box in accordance with the selection operation, wherein the first prompt box comprises a first option indicating an addition of the to-be a copied content into a pasting source list and a second option indicating the addition of the to-be-copied content into a target file in a pasting destination list wherein the number of the second portion is the same as the number of the target file in the pasting destination list;
    receiving a first selection operation made on at least one of the first option and the second option; and executing: (i) adding the to-be-copied content into the pasting source list as a to-be-pasted content, or (ii) pasting the to-he-copied content to the selected target file or (iii) adding the to-be-copied content into the pasting source list as a to-be-pasted content and pasting the to-be-copied content to the selected target file, in response to the first selection operation, wherein the target file is add into the pasting destination list through:

detecting a selection operation made on a to-be-pasted position in a second file;

outputting a second prompt box in accordance with the selection operation, wherein the prompt box comprises a third option indicating the addition of the second file into the pasting destination list and a fourth option indicating the to-be-pasted content in the pasting source list into the second file;

receiving a second selection operation made on (i) the third option, or (ii) the fourth option, or (iii) the third option the fourth option; and executing: (i) adding the second file into the pasting destination list as a target file, or (ii) pasting the selected to-be-pasted content to the second file, or (iii) adding the second file into the pasting destination list as target lie and pasting the selected to-be-pasted content to the second file, in response to the second selection operation, wherein the pasting source list is adapted for adding one or more to-be-pasted contents selected and copied from different first files; and the pasting destination list is adapted for adding one or more second files where the one or more to-be-pasted content are to be pasted, wherein subsequent to the executing: (i) adding to-be-copied content into the pasting source list as a to-be-pasted content, or (ii) pasting the to-be-pasted content to the selected target file, or (iii) adding to-be-copied content into the pasting source list as a to-be-pasted content and pasting the to-be-copied content to the selected target file, in response to the first selection operation, the multi-path copying and pasting method further comprises:

displaying context information about a pasted content in the target file for the preview of a pasting result, when the to-be-copied content has been pasted to the selected target file; and displaying the to-be-pasted content in the pasting source list, and setting the pasting source list to be in an editable state, when the to-be-copied content has been added into the pasting source list as the to-be-pasted content, wherein subsequent to detecting the selection operation made on the to-be-pasted position in the second file, the multi-path copying and pasting method further comprises:

outputting a shortcut pasting prompt option in accordance with the selection operation; and adding a newly-added to-be-pasted content in the pasting source list to the to-be-pasted position in the second file, upon the receipt of a selection operation made on the prompt option.

2. The multi-path copying and pasting method according to claim 1, wherein subsequent to the executing: (i) adding the second file into the pasting destination list as a target file, or (ii) pasting the selected to-be-pasted content to the second file, or (iii) adding the second file into the pasting destination list as a target file and pasting the selected to-be-pasted content to the second file, in response to the second selection operation, the multi-path copying and pasting method further comprises:

displaying information about the target file in the pasting destination list, and setting the pasting destination list to be in an editable state, when the second file has been added into the pasting destination list as the target file; and displaying context information about the pasted content in the second file for the preview of a pasting result, when the selected to-be-pasted content has been pasted to the to-be-pasted position in the second file.

3. The multi-path copying and pasting method according to claim 2, wherein subsequent to detecting the selection operation made on the to-be-pasted position in the second file, the multi-path copying and pasting method further comprises:

outputting a shortcut pasting prompt option in accordance with the selection operation; and adding a newly-added to-be-pasted content in the pasting source list to the to-be-pasted position in the second file, upon the receipt of a selection operation made on the prompt option.

4. The multi-path copying and pasting method according to claim 1, wherein subsequent to detecting the selection operation made on the to-be-pasted position in the second file, the multi-path copying and pasting method further comprises:

outputting a shortcut pasting prompt option in accordance with the selection operation; and adding a newly-added to-be-pasted content in the pasting source list to the to-be-pasted position in the second file, upon the receipt of a selection operation made on the prompt option.

5. A non-transitory computer-readable storage medium storing therein a computer program, wherein the computer program is executed by a processor so as to implement the multi-path copying and pasting method according to claim 1.

6. A mobile terminal, comprising a processor, a memory, and a computer program stored in the memory and executed by the processor, wherein the processor is configured to execute the computer program so as to implement a multi-path copying and pasting method, comprising:

detecting a selection operation made on a to-be-copied content in a first file;

outputting a first prompt box in accordance with the selection operation wherein the first prompt box comprises a first option indicating an addition of the to-be copied content into a pasting source list and a second option indicating the addition of the to-be-copied content into a target file in a pasting destination list wherein the number of the second portion is the same as the number of the target file in the pasting destination list;

receiving a first selection operation made on at least one of the first option and the second option; and executing: (i) adding the to-be-copied content into the pasting source list as a to-be-pasted content, or (ii) pasting the to-he-copied content to the selected target file or (iii) adding the to-be-copied content into the pasting source list as a to-be-pasted content and pasting the to-be-copied content to the selected target file, in response to the first selection operation, wherein the target file is added into the pasting destination list through:

detecting a selection operation made on a to-be-pasted position in a second file;

outputting a second prompt box in accordance with the selection operation, wherein the prompt box comprises a third option indicating the addition of the second file into the pasting destination list and a fourth option indicating the to-be-pasted content in the pasting source list into the second file;

receiving a second selection operation made on (i) the third option, or (ii) the fourth option, or (iii) the third option the fourth option; and executing: (i) adding the second file into the pasting destination list as a target file, or (ii) pasting the selected to-be-pasted content to the second file, or (iii) adding the second file into the pasting destination list as target fie and pasting the selected to-be-pasted content to the second file, in response to the second selection operation, wherein the pasting source list is adapted for adding one or more to-be-pasted contents selected and copied from different first files; and the pasting destination list is adapted for adding one or more second files where the one or more to-be-pasted content are to be pasted, wherein subsequent to the executing: (i) adding to-be-copied content into the pasting source list as a to-be-pasted content, or (ii) pasting the to-be-pasted content to the selected target file, or (iii) adding to-be-copied content into the pasting source list as a to-be-pasted content and pasting the to-be-copied content to the selected target file, in response to the first selection operation, the multi-path copying and pasting method further comprises:

displaying context information about a pasted content in the target file for the preview of a pasting result, when the to-be-copied content has been pasted to the selected target file; and displaying the to-be-pasted content in the pasting source list, and setting the pasting source list to tee an editable state, when the to-be-copied content has been added into the pasting source list as the to-be-pasted content, wherein subsequent to detecting the selection operation made on the to-be-pasted position in the second file, the multi-path copying and pasting method further comprises:

outputting a shortcut pasting prompt option in accordance with the selection operation; and adding a newly-added to-be-pasted content in the pasting source list to the to-be-pasted position in the second file, upon the receipt of a selection operation made on the prompt option.

7. The mobile terminal according to claim 6, wherein subsequent to the executing: (i) adding the to-be-copied content into the pasting source list as a to-be-pasted content, or (ii) pasting the to-be-copied content to the selected target file, or (iii) adding the to-be-copied content into the pasting source list as a to-be-pasted content and pasting the to-be-copied content to the selected target file, in response to the first selection operation, the multi-path copying and pasting method further comprises:

displaying context information about a pasted content in the target file for the preview of a pasting result, when the to-be-copied content has been pasted to the selected target file; and displaying the to-be-pasted content in the pasting source list, and setting the pasting source list to be in an editable state, when the to-be-copied content has been added into the pasting source list as the to-be-pasted content.

8. The mobile terminal according to claim 6, wherein subsequent to the executing; (i) adding the second file into the pasting destination list as a target file, or (ii) pasting the selected to-be-pasted content to the second file, or (ii) adding the second, file into the pasting destination list as a target file and pasting the selected to-be-pasted content to the second file, response to the second selection operation, the multi-path copying and pasting method further comprises:

displaying information about the target file in the pasting destination list, and setting the pasting destination list to be in an editable state, when the second file has been added into the pasting destination list as the target file; and displaying context information about the pasted content in the second file for the preview of a pasting result, when the selected to-be-pasted content has been pasted to the to-be-pasted position in the second file.

9. The mobile terminal according to claim 6, wherein subsequent to detecting the selection operation made on the to-be-pasted position in the second file, the multi-path copying and pasting method further comprises:

outputting a shortcut pasting prompt option in accordance with the selection operation; and adding a newly-added to-be-pasted content in the pasting source list to the to-be-pasted position in the second file, upon the receipt of a selection operation made on the prompt option.

* * * * *